Jan. 6, 1959 T. HAFNER 2,867,686

ELECTRONIC STORAGE TUBES

Filed Nov. 2, 1953

INVENTOR.
THEODORE HAFNER
BY Theodore Hafner
ATTORNEY

United States Patent Office 2,867,686
Patented Jan. 6, 1959

2,867,686

ELECTRONIC STORAGE TUBES

Theodore Hafner, New York, N. Y.

Application November 2, 1953, Serial No. 389,599
4 Claims. (Cl. 178—6.8)

This invention relates to electric or electronic storage tubes and more specifically to the production of several independent pictures on one and the same fluorescent screen.

One of the objects of the invention is to maintain on the screen different pictures during different time intervals, and more specifically one or more pictures in a more or less substantially continuous manner while one or more further pictures are extinguished from time to time and replaced by other pictures without substantially affecting the first pictures.

Another object of the invention is to store different pictures in different colors substantially independently from each other and to replace one or several of these pictures at and for independent time intervals.

A specific object of the invention is to extinguish from a picture certain predetermined components or parts such as foreground or background or accessories and to replace the components or parts by other components or parts.

Still another object of the invention is to store different picture or picture components on different predetermined sections of the storage screen and to reproduce them on a fluorescent screen substantially independent from each other.

A more specific object of the invention is to control the collector electrode or receiving screen of a cathode ray tube through a number of grid elements arranged in a plane substantially parallel to the screen and through a storage layer arranged between grid elements and screen in such a way as to deflect the writing beam under control of predetermined grid elements to predetermined sections of the storage layer only, while leaving other storage sections empty or unfilled, ready to be recorded upon or filled with other signals or pictures under control of other predetermined grid elements.

Another specific object of the invention is to provide two beams of cathode rays, one writing beam and one flooding beam, and to utilize the writing beam for the storage of the different picture components while the flooding beam serves to maintain the storage layer at viewing beam cathode potential.

A further object of the invention is to select from a number of pictures or picture components, one or more predetermined pictures or picture components to store these pictures or picture components in a single cathode ray tube for independent representation on one and the same fluorescent screen under control of the same storage layer and under control of different sections of an array of grid elements which in turn are arranged to control such storage layer.

These and other objects of the invention will be explained more fully by way of drawings annexed herewith in which Fig. 1 represents an electrode system embodying certain principles of the invention.

Figures 1, 2, 3, 4, 5, 6:
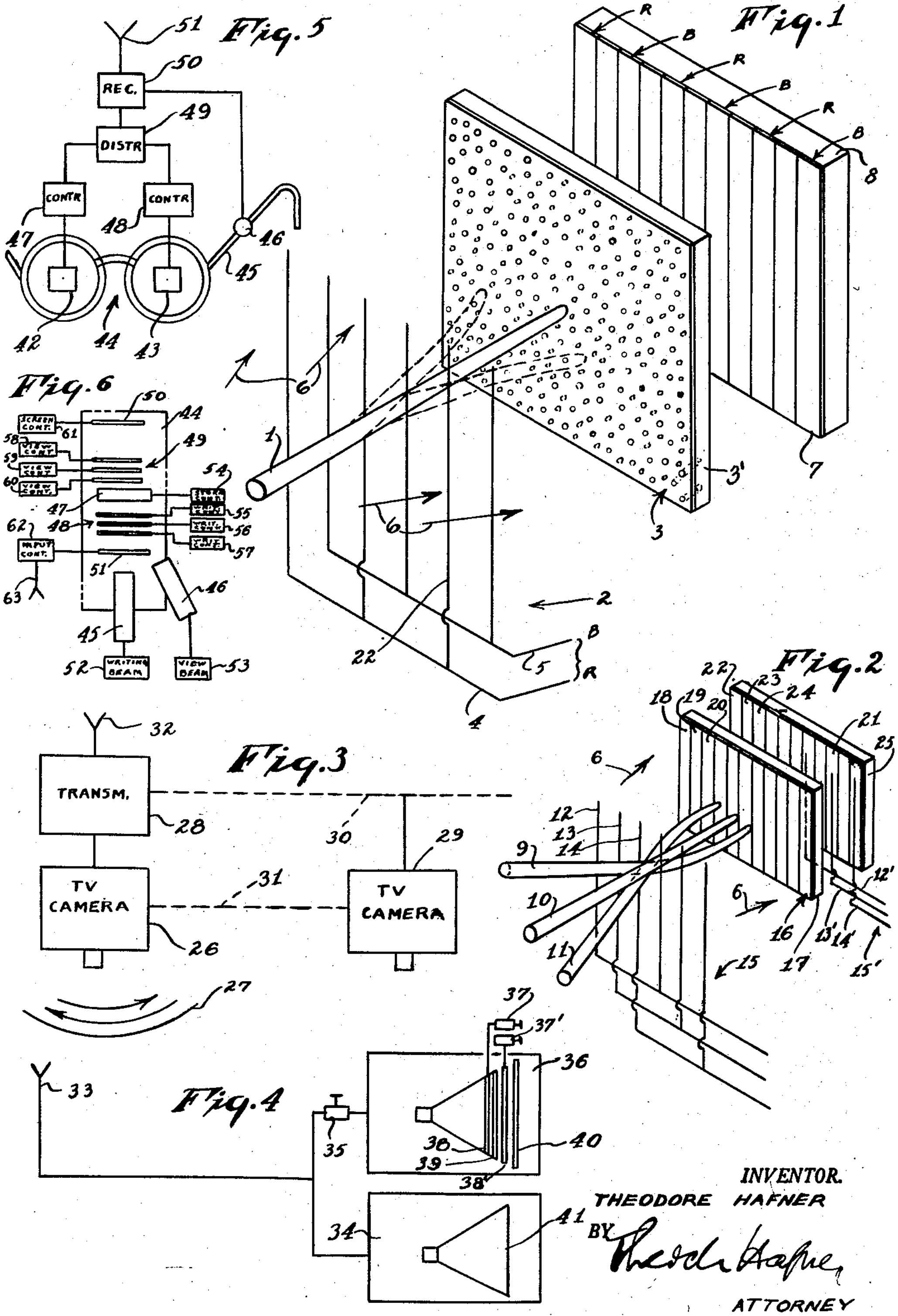
Fig. 2 represents a modification of Fig. 1.
Figs. 3 and 4 represent a realization of the invention.

Figs. 5 and 6 representative circuit diagrams.

In a preferred embodiment of the invention, as shown for example in Fig. 1, a number of pictures, for example, three pictures, are stored in the form of electron charges on a common storage layer whereby the charges corresponding to each picture are arranged on an array of elemental areas extending in a regular fashion over the entire storage layer but at predetermined spacings from each other. In this way in the spaces between the elemental areas associated with one picture, one or more other pictures may be stored on similarly arranged arrays of elemental areas.

Recording of each of these pictures on the array of elemental areas associated therewith is caused to occur in otherwise well-known manner through arrays of deflecting grids which depending upon potentials applied on the different deflecting grids, deflect a recording cathode ray beam to one or the other of the arrays of elemental areas.

As apparent from Fig. 2 depending upon the different potentials applied to a second plurality of grid arrays, the charges on the storage layer can be picked up selectively, and one or the other of the pictures stored on the storage layer be selectively reproduced on a fluorescent screen.

In Fig. 1, in a cathode ray tube of otherwise well known construction, a cathode ray schematically indicated at 1 is produced and directed in well known manner through the grid elements of an electrostatic cylindrical lens system schematically indicated at 2, thereby focusing the picture on a storage layer 3 of well known construction consisting for example of $SiO_2$ vaporized on a perforated or grilled base 3'.

Cathode ray beam 1 is controlled by picture signals in otherwise well known manner and deflected to scan storage layer 3 so as to store a corresponding picture in the form of minute charges corresponding to the picture elements and retained on storage layer 3.

As apparent from Fig. 1 the elements of focusing grid 2 are subdivided into two or more groups as the case may be without exceeding the scope of the invention, schematically indicated at 4 and 5 which permits to apply different control voltages on these different grid arrays 4 and 5 and thereby to focus different pictures derived for example from cathode ray 1 at successive time intervals, on different portions of storage layer 3.

For viewing, a spread-out beam of electrons as schematically indicated at 6 is applied on storage layer 3 and with appropriate control potentials being applied to grid section 4 or 5 or both, and the picture or pictures being stored on storage layer 3 and reproduced on fluorescent screen 7 supported on receiving electrode 8 in otherwise well known manner.

In a particular example of operation, the storage layer 3 receives a considerably lower voltage say 0 volt than the fluorescent screen electrode 8 which receives say 5,000 volts while the focusing grid 2, if operated for storage, receives a voltage of the order of say 1000 volts.

The corresponding cathode potential of writing beam 1 is placed at minus 2000 volts while the corresponding cathode potential of the viewing beam 6 is placed at 0 volt.

If as shown in Fig. 1 one beam is used for writing several pictures, control grid 2 is used to both deflect and focus beam 1.

If, however, as shown in Fig. 2 several cathode ray beams are used to write several pictures, control grid 2 is used only to focus the different beams, deflection being caused in otherwise well known manner by the different guns (not shown) directing the different beams.

In the example shown in Fig. 1, erasing of the signals or charges stored on layer 3 is caused to occur by applying an appropriate erasing potential such as 0 volt through beam 1. This is done by pulsing viewing beam 1 at its cathode, or through the storage grid 2, with pulses of a repetition rate of say 1000 per second and a duration of 10 micro seconds.

Erasure if desired can also be caused by a separate erasing beam taking the place of viewing beam 1 and pulsed to a different cathode voltage, or at the storage grid in a manner similar to that mentioned above with respect to erasing with the use of viewing beam 1.

In order to suppress or at least minimize gun grid current, the signal input grid (not shown) for writing beam 1 is negatively biased.

It should also be noted that deflection potentials are applied to grid 2 only during the relatively short writing period, i. e. for the duration of a few frames—say 6 frames or for a time interval of about 0.1 second; otherwise viewing beam 6 would also be focused into stripes causing an undesired moire effect.

In order to permit the combination of pictures of different duration and to reduce transmission band width to a minimum, for example by superimposing a relatively short duration live action on a relatively long duration background, and in order to replace the background at will or if desired, storage layer 3 is subdivided in elements corresponding to and under control of the different sections of grid 2 and their potentials as apparent for example from the realization of the invention shown in Fig. 2.

In Fig. 2 a number of writing beams 9, 10, 11 is used to control independent storage of the different pictures—the several beams being also replaceable by a lesser number of beams or by a single beam without exceeding the scope of this part of the disclosure—through a number of grid sections 12, 13, 14 constituting focusing grid 15 which controls the electron flow to a storage layer 16 supplied on a perforated backing plate 17, and its discharge from storage layer 16 on to a fluorescent screen.

Storage layer 16 is divided in a number of triples of elementary storage strips 18, 19, 20 having different decay characteristics and consisting for example of strips of vaporized $SiO_2$, $Al_2O_3$ and CaO layers arranged to be impinged upon by beams 9, 10, 11 under the control of the different grid sections 12, 13, 14.

In Fig. 2 fluorescent layer 21 is similarly subdivided into elementary strips or triples of strips 22, 23, 24 adapted to fluoresce in different colors so as to permit to distinguish the different pictures for example the relatively steady map of a P. P. I. picture from the varying radar pictures superimposed thereupon, or to distinguish a radar picture showing enemy aircraft from a radar picture superimposed thereupon in different color and showing friendly aircraft, etc.

In another modification of the invention which can be easily derived from Figs. 1 and 2 and therefore does not require further illustration, instead of a subdivision of grid 14 and/or of storage layer 16, and/or of fluorescent layer 21 into two or three or more elementary strips depending upon the number of pictures or picture sections to be stored and reproduced independently, subdivision can be made into four or more sections and thereby four and more separate pictures can be separately stored on and separately reproduced from one and the same cathode ray tube without departing from the scope of this disclosure.

It is also feasible to utilize as indicated in Fig. 2 in addition to grid section 15 with its three separate grid sections 12, 13, 14 which are independently controlled by appropriate voltages, a second grid system 15′ consisting of three more separate sections of grid wires 12′, 13′, 14′ and to control by the application of suitable control voltages to grid sections 12′, 13′, 14′ the different electron rays derived from the different storage elements under control of the viewing beam schematically indicated by arrow 6 so as to cause separate and selective reproduction of the different pictures stored on storage layer 16, and reproduced on different portions of fluorescent screen 21.

In a further modification of this part of the invention more than two or three storage areas of storage layer 16 can be used to correspond to one focal area of grid 15 and accordingly the potentials applied to focusing grid 15 can consequently be made instead of being zero and maximum as in the case just described, to have intermediate values corresponding to intermediate deflection angles and providing additional storage space and resulting in storage of more than three pictures, without exceeding the scope of this disclosure.

Fig. 3 explains a particular realization of some of the aspects of this invention.

In this realization of the invention one or more predetermined pictures or other reading matter is selected for storage and representation at predetermined time moments or intervals from a number of successive pictures or other reading matter.

In the example illustrated in Fig. 3 the pictures or reading matter consist of a continuous representation of stock exchange information for example in the form of different sections of a ticker board transmitted successively for example by television in otherwise well known manner in the form of a series of successive pictures.

For this purpose as schematically indicated in Fig. 3 a television camera 26 is arranged to be moved gradually, slowly and continuously with respect to a ticker board 27 exhibiting the entire stock exchange list or a predetermined portion thereof.

Camera 26 is moved continuously to and fro in directions substantially perpendicular to its optical axis, respectively at a specific speed of say 3 ft. per second.

If the size of the entire ticker board to be scanned by camera 26 is assumed to be 9 x 9 ft. the movement of camera 26 can be intermittent so as to cover at each movement a square area of 3 x 3 ft. thus taking 9 seconds for the scanning of the entire area of ticker board 27.

Alternatively, the movement of camera 26 can be made gradual and continuous and in any case accomplished by a gear mechanism not shown but causing a periodic movement of camera 26 in otherwise well known manner. It is apparently not necessary to feed only one television camera 26 to transmitter 28 connected there and thereby represent a single ticker board such as shown at 27, but transmitter 28 can be fed electrically from several ticker boards and a number of corresponding television cameras one of which is shown at 29 and controls transmitter 28 over line 30 in appropriate phase relation so as to feed the signals of camera 29 to transmitter 28 to be superimposed upon signals derived from camera 26 in a predetermined phase relationship therewith.

Accordingly the motors of cameras 26 and 29 are caused to be coordinated for substantially synchronous or phased motion as schematically indicated by dotted control line 31, in otherwise well known manner which therefore is not required to be described in detail.

The superimposed signals derived from cameras 26 and 29 are transmitted over antenna 32 and are received at a receiving station for instance at an individual brokerage office.

Instead of wireless transmission, wired transmission can be provided without exceeding the scope of the invention.

At the receiver station as shown in Fig. 4 the signals are received at antenna 33 and fed into a television receiver 34, of more or less standard construction but also simultaneously fed over a switch 35 to a combined storage and representation tube such as indicated in Figs. 1 and 2 and such as schematically indicated in Fig. 4 at 36.

Storage tube 36 is provided in accordance with this invention with two adjustable control devices schematically indicated at 37, 37' for applying different control voltages on different sections of focusing systems 38, 38' such as indicated in Fig. 1 at 2 and in Fig. 2 at 15, 15' and including as indicated in Fig. 1 sections 4, 5 and as indicated in Fig. 2, sections 12, 13, 14 and 12', 13', 14'. In this way the signals received will be stored on appropriate portions or sections of storage layer 39 and reproduced at predetermined time intervals, on fluorescent screen 40.

The device shown in Fig. 4 operates in the following manner:

While watching on screen 41 of television receiver 34 the various sections of the stock exchange board or boards 27 slowly succeeding each other under control of the movement of camera 26 and/or camera 29, the operator or user of the device will proceed in the following manner.

As soon as a section of the stock exchange board appears on television screen 41 which is of interest to him and which he wants to store and retain for closer observation at predetermined time intervals he operates switch 35 which will feed the corresponding signals into storage device 36 and depending upon the position of switch 37 is stored in the form of electrical charges on a predetermined section or portion of storage layer 38 of storage tube 36 which is schematically indicated at 38. From this section of storage layer 39 under control of switch 37' the corresponding or desired section of the ticker board can be reproduced at any desired moment on the screen 40 of storage device 36 in the manner described and illustrated with respect to Figs. 1 and 2.

In this way, two, three or more sections of the stock exchange board 27 can be selected for storage and reading.

Switches 35 and 37 are of the electric or electronic type, or gating devices of otherwise well known construction and designed to produce the desired control voltages of required wave form and phase relation—all this without departing from the scope of this disclosure.

More specifically such switching or gating devices can be arranged in otherwise well known manner so as to be controlled by the frequencies or frequency ranges to be switched or gated so that for example a background picture transmitted over a relatively small frequency band will be automatically stored on one predetermined portion of the storage layer to remain there for a relatively long or protracted time interval—say several seconds or minutes while a live action transmitted over relatively wide frequency band will be automatically stored on another predetermined portion of the storage layer to remain there for a relatively short or transient time interval—say 1/30 of a second.

In order to facilitate storage, the different component pictures can be permanently recorded and separately, with different band widths whereby a relatively small band width permits the use of otherwise well known mechanical, magnetic or photo electric recording processes. The permanent records thus derived from these processes can be scanned or picked up also in otherwise well known manner and the resulting electrical signals correspond to the different picture components can be transmitted or superimposed for example upon a live action to a storage device such as shown in Fig. 1 or 2 for storing the different signals or signal trains on separate portions of a storage layer in accordance with the principles set forth above.

In this way, furthermore, the band width of a composite picture including for example a quickly changing live action and a slowly changing background or foreground can be transmitted over an overall band width which is reduced to a minimum.

In this realization of the invention the signals correspond to one component of the composite pictures and are extinguished by means of the switching device and other signals are furnished over the writing beam to the storage surface while the switch is in one predetermined position. Thereafter the switch is moved into another predetermined position and in the space left open by the writing beam another picture component is recorded. Here, too, the switching device can be of a manual or automatic, electric or electronic type and can be controlled by the signal trains themselves.

In a more specific way of realizing the invention a live scene of a predetermined character taken for example in a studio is added to a synthetic background or foreground taken substantially independently from the studio taking as is the case for instance in motion picture or television production.

In this case in accordance with the invention the storage tube is used on one portion of its storage layer to store a prerecorded picture derived for example from a photographic, mechanical or magnetic record, relatively continuously—say for a time interval of 10 minutes.

Then another prerecorded background or foreground is stored in place of the previous background and remains while the live scene is going as before.

These different picture components of relatively long duration may be imparted to the storage layer at and for different storage intervals by causing extinction to occur at predetermined potential levels being applied to the grids or grid sections controlling the storage layer, under control of the frequencies carrying the different picture components.

For example, one picture component can be a televised picture which will be extinguished after relatively short time say after 1/30 of a second while a stationary picture carrying a background will be maintained for about 10 minutes. In this way the background picture does not require for its storage and transmission a band width such as is required for the quickly changing televised picture. The relatively permanent picture requires a relatively small band width for example less than one megacycle while for the televised picture itself a usually relatively great band width is required. The invention thus permits to visualize the television picture combined with a background of component derived from a mechanical or magnetic record.

In another embodiment of the invention reproduction of a television picture is realizable not only on an objective tube screen but also on a subjective tube screen, i. e. from one or more cathode ray tubes carried by an individual which desires to view a televised picture in a manner not accessible to other people.

In accordance with this embodiment of the invention as illustrated for example schematically in Fig. 5, two cathode ray tubes 42, 43 of relatively small size but otherwise similar to the tubes shown in Figs. 1 and 2 are carried on a spectacle type frame 44 which also supports on at least one of its straps 45 an earphone 46 engaging the ear like the pickup of a hearing aid.

Tube 42 is operated under control of control circuit 47 to reproduce one predetermined portion or component of a picture for example in alternating say odd numbered lines of the screen raster, while another picture component is reproduced in tube 43 under control of control circuit 48 also in alternating say even numbered lines of the raster, interlacing with the odd lines, of picture tube 42.

Control circuits 47, 48 including filament, grid, plate deflection and other tube controlling circuits required for the proper operation of cathode ray tubes 42, 43 in turn are controlled by a distributing circuit 49 which serves to separate the different signal trains required for the operation of the different cathode ray tubes, from the common signal train derived over receiver 50 from antenna 51 or any other receiving means.

Thus the user or wearer of the device will be permitted to see a complete composite picture derived from separate cathode ray tubes.

If in accordance with this invention at least one or both cathode ray tubes 42, 43 are of the storage type shown in Figs. 1 or 2 the number of picture components independently to be switched out or in to the composite picture will be increased or doubled as compared with the use of a single storage tube adapted for objective viewing.

In a further modification of this part of the invention each of the two cathode ray tubes 42, 43 can be controlled by two trains of stereoscopically related picture signals so that the viewer will be able to see the composite picture in stereoscopic vision or if the two trains are representative of complementary color components the viewer will be able to see the composite picture in color, whereby in accordance with the invention each of these cathode ray tubes may permit switching in or out of two or more independent picture components at appropriate time intervals under control of the grids controlling the storage layer which in turn can be controlled by the signal trains themselves for example by their frequency characteristics.

In the circuit diagram of Fig. 6 the broad use is explained of a combined television and storage tube in accordance with the invention.

The tube is diagrammatically indicated at 44. It contains an electron gun for writing schematically indicated at 45, an electron gun for viewing schematically indicated at 46, a storage electrode 47 and grid systems 48 and 49 arranged in front and behind storage electrode 47 respectively to control passage of writing electrons, and passage of electrons derived from storage electrode 47 under control of the viewing beam respectively.

The receiving or screen electrode is indicated at 50 and the grid or input electrode at 51.

The various electrodes are controlled in otherwise well known manner from circuits coupled thereto and intercoupled if necessary as apparent from Fig. 5 in which writing gun 45 is controlled by a control circuit 52, viewing gun 46 by control circuit 53, storage electrode 47 by voltage supply circuit 54, grid systems 48 and 49 by voltage supply circuits 55, 56, 57 and 58, 59 and 60 respectively. Receiving electrode 50 is controlled by another voltage supply circuit 61 while grid or input electrode 51 is controlled from a receiver circuit 62 connected to a source of input supply such as antenna 63.

In order to operate tube 44 the signals received for example from antenna 63 and representing the contents of a television picture frame are applied over receiver 62 to grid 51 of writing beam gun 45 to produce on storage layer 47 charges corresponding to the elements of the transmitted picture frame. Simultaneously under control of a predetermined voltage derived from one of the voltage supply circuits 55, 56, 57 and applied to one of the sectors of grid system 48, the frame signals are stored on a predetermined sector of storage electrode 47.

Similarly other and successive television frames can be stored under control of their respective voltage supply circuits over the corresponding sectors of grid system 48 on other sectors of storage layer 47.

In case reproduction of one of these picture frames on screen 50 is desired, writing gun 45 is switched off and viewing gun 46 is switched on and the corresponding sectors of storage layer 47 under control of viewing beam 46 are discharged selectively or simultaneously depending upon the operation of voltage supply sources 58, 59 and 60 which in turn control the different sectors of grid system 49.

It is also feasible in another realization of the invention to produce the composite picture both in stereoscopy and color by transmitting to the different cathode ray tubes, trains of signals representing not only different color components but which simultaneously represent stereoscopically related picture components.

The invention is not limited to the specific reading arrangement nor to form and type of electrode systems nor to the specific uses shown and described but can be applied and utilized in any form or manner also without departing from the scope of this disclosure.

I claim:

1. In an electronic storage device, a storage layer including a pattern of discrete elements adapted to store information under control of electrons of one predetermined pulsation frequency applying one predetermined potential thereto, and adapted to release information under control of electrons of another predetermined pulsation frequency applying another predetermined potential thereto substantially lower than said first predetermined potential, means for selectively directing electrons of different pulsation frequencies to said storage layer, several arrays of grid elements arranged in front of said storage layer, each array being arranged in front of a corresponding array of storage elements so as to selectively either permit or restrict passage of electrons to said storage elements upon different voltages being applied to said grid elements, separate switching means including voltage sources for selectively applying different voltages to each of said grid arrays so as to either permit or restrict passage of electrons to each of the different arrays of storage elements for time intervals substantially independent of each other; said arrays of storage elements including at least one array of storage elements having a leakage delay which is substantially larger than that of the other arrays of storage elements; said different arrays of storage elements being interlaced so that each array of storage elements extends in intervals over the entire area of the storage layer, and a receiving layer arranged behind said storage layer substantially coextensive therewith for converting the electrons released from that storage layer into a visible picture.

2. Device according to claim 1 comprising two electron guns, one high pulsation frequency gun for writing, and one low pulsation frequency gun for viewing, and means including sources of signals for controlling said low pulsation frequency electrons and said switching means so as to cause viewing of signals during predetermined time intervals.

3. Device according to claim 1 comprising two electron guns, one high pulsation frequency gun for writing, and one low pulsation frequency gun for viewing and means including sources of signals for controlling said high pulsation frequency electrons and said switching means so as to cause storage of signals at predetermined time intervals and on predetermined arrays of storage elements.

4. Device according to claim 1 comprising additional grid arrays between said storage layer and said receiving layer, each of said additional grid arrays being arranged in front of a corresponding array of receiving elements so as to selectively either permit or restrict passage of electrons from said storage elements to said receiving elements upon different voltages being applied to said different arrays of additional grid elements, and separate switching means including voltage sources for selectively applying different voltages to each of said additional grid arrays so as to selectively either permit or restrict passage of electrons to each of the different arrays of receiving elements for time intervals substantially independent from each other, said different arrays of receiving elements being interlaced so that each array of receiving elements extends in intervals over the entire area of the receiving electrode.

References Cited in the file of this patent

UNITED STATES PATENTS

| | | |
|---|---|---|
| 2,513,743 | Rajchman | July 4, 1950 |
| 2,754,449 | Farnsworth | July 10, 1956 |
| 2,761,089 | Haeff | Aug. 28, 1956 |